(12) United States Patent
Chatterton

(10) Patent No.: US 10,552,821 B2
(45) Date of Patent: Feb. 4, 2020

(54) DONGLE DEVICE FOR AUTOMATIC PAIRING OF PAYMENT TERMINAL TO MOBILE COMPUTING DEVICE

(71) Applicant: PAYPAL, INC., San Jose, CA (US)

(72) Inventor: Geoffrey W. Chatterton, Santa Clara, CA (US)

(73) Assignee: PAYPAL, INC., San Jose, CA (US)

( * ) Notice: Subject to any disclaimer, the term of this patent is extended or adjusted under 35 U.S.C. 154(b) by 1042 days.

(21) Appl. No.: 14/995,093

(22) Filed: Jan. 13, 2016

(65) Prior Publication Data

US 2017/0200144 A1  Jul. 13, 2017

(51) Int. Cl.
  *G06Q 20/32* (2012.01)
  *G06K 19/06* (2006.01)
  *G06Q 20/30* (2012.01)

(52) U.S. Cl.
  CPC ... *G06Q 20/3224* (2013.01); *G06K 19/06187* (2013.01); *G06Q 20/30* (2013.01); *G06Q 20/327* (2013.01)

(58) Field of Classification Search
  CPC .......................... G06Q 20/3224; G06Q 20/327
  USPC ......................................................... 235/379
  See application file for complete search history.

(56) References Cited

U.S. PATENT DOCUMENTS

| | | | |
|---|---|---|---|
| 8,095,631 B2* | 1/2012 | Manico ............. | H04N 1/00132 709/220 |
| 9,639,907 B2* | 5/2017 | Theobald ............... | G06Q 50/12 |
| 2005/0149204 A1* | 7/2005 | Manchester ............ | H04L 29/06 700/1 |
| 2011/0010470 A1* | 1/2011 | Hulbert .................. | G06F 3/0219 710/13 |
| 2015/0199668 A1* | 7/2015 | Fernando ............. | G06Q 20/203 705/14.65 |
| 2015/0332242 A1* | 11/2015 | Perry .................... | G06Q 20/206 705/18 |
| 2016/0057626 A1* | 2/2016 | O'Toole ................ | H04W 12/08 726/4 |
| 2016/0203680 A1* | 7/2016 | Sambe ............... | G06Q 20/3276 235/383 |

* cited by examiner

*Primary Examiner* — Toan C Ly

(74) *Attorney, Agent, or Firm* — Haynes and Boone, LLP

(57) ABSTRACT

There are provided systems and methods for a dongle device for automatic pairing of payment terminal to mobile computing device. A merchant location may include one or more merchant devices used to provide sales to between the merchant and customers through generating transactions and processing payments. In this regard, the merchant devices may use connectable terminals that provide payment instrument processing. The connectable terminals may utilize a wireless connection with a merchant device and allow a user to provide their payment instrument, such as an EMV payment card, to the terminal to insert their payment information into a transaction. In order to pair the terminal to the merchant device, a dongle device may be added to the terminal to provide connection information to the merchant device for automatic pairing. The dongle device may also remove the connection information on removal or insertion of a new dongle device.

20 Claims, 5 Drawing Sheets

400

402 — In response to a dongle device connecting to a computing device system, receive, by the computing device system that comprises one or more hardware processors coupled to a non-transitory memory, connection information for the connectable device, wherein the connection information comprises at least one connection parameter for a connectable device and for use in establishing a wireless connection between the computing device system and the connectable device

404 — Process the connection information using communication protocol information comprising at least one communication protocol for establishing the wireless connection with the connectable device

406 — Establish the wireless connection with the connectable device using one of the at least one communication protocol, wherein the wireless connection is established using the at least one connection parameter for the connectable device

408 — Communicate with the connectable device

FIG. 4

DONGLE DEVICE FOR AUTOMATIC PAIRING OF PAYMENT TERMINAL TO MOBILE COMPUTING DEVICE

TECHNICAL FIELD

The present application generally relates to wireless pairing of processing devices, and more specifically to dongle device for automatic pairing of payment terminal to mobile computing device.

BACKGROUND

A merchant location may utilize mobile merchant devices to provide transaction processing with customers at the merchant location, for example, using tablet computers and handheld computing devices. These mobile merchant devices allow merchant employees to more easily process transactions when on the move between customers or when the customers may be mobile throughout the merchant location. These mobile merchant devices may require associated terminals to allow for entry of payment instrument information by a customer, such as a magnetic card reader and/or EMV card reader (e.g., a smart card having an embedded integrated chip according to the EMV standard or other technical standard). However, where these terminals may be wireless so that they may be handed over to a customer for the customer to enter a payment instrument and associated authentication (e.g., password, personal identification number (PIN), and/or signature), the terminals may be on and lose power. Thus, setup time between newly charged terminals may be cumbersome to employees to establish the wireless connection between the mobile merchant device and a new terminal. Moreover, if a terminal is misplaced and a new one quickly needed, changing connections between terminals may add additional time to transaction processing and cause customer dissatisfaction.

BRIEF DESCRIPTION OF THE DRAWINGS

FIG. 4 is a flowchart for dongle device for automatic pairing of payment terminal to mobile computing device, according to an embodiment.

Figure 1:
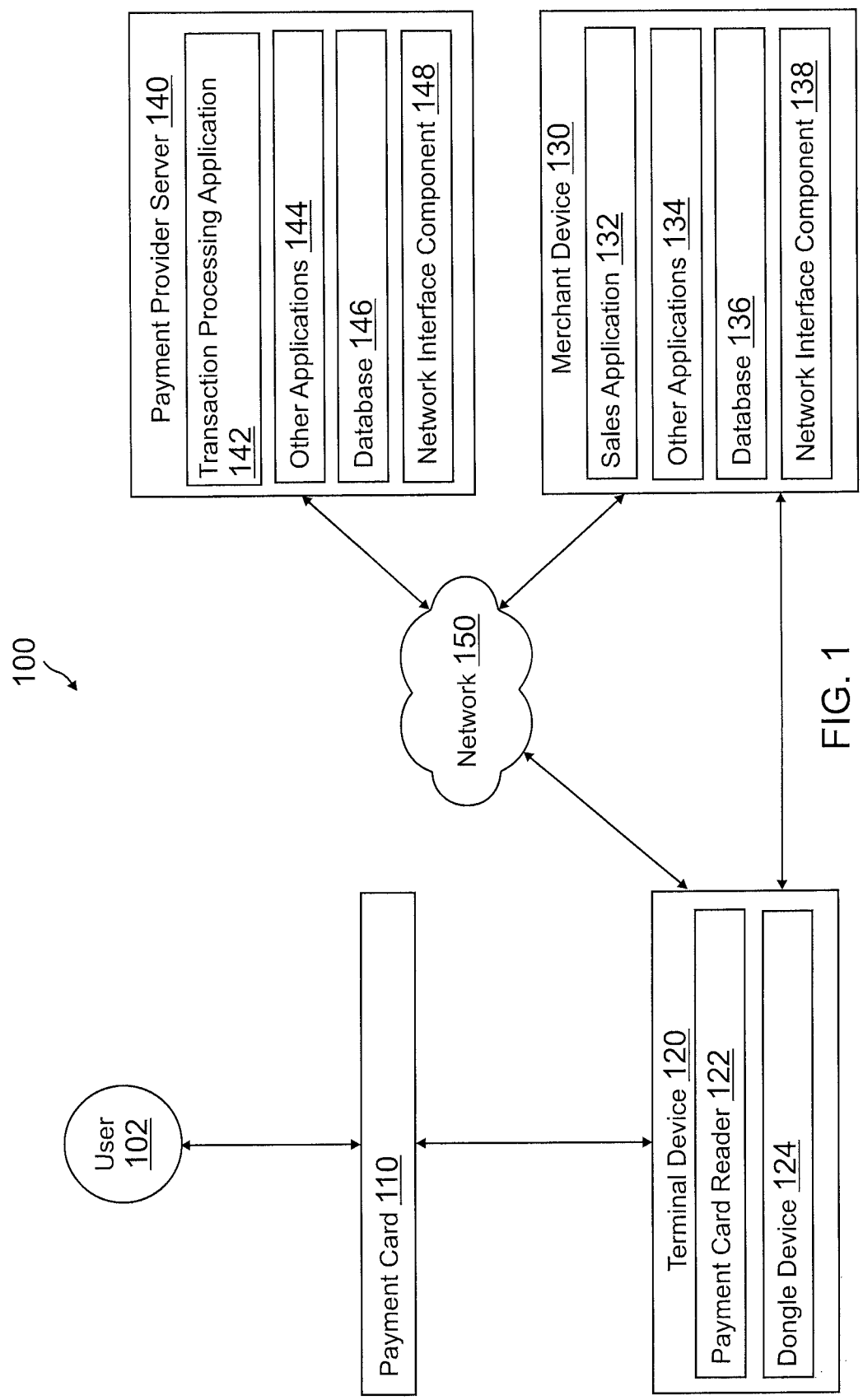
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for dongle device for automatic pairing of payment terminal to mobile computing device. Systems suitable for practicing methods of the present disclosure are also provided.

A merchant may utilize a portable terminal that accepts payment cards for payment processing, such as a portable magnetic card reader or EMV card reader that may be brought directly to a user. Various merchant locations for merchants may provide one or more products, goods, or services (referred to herein as an "item" or "items") for sale to users (e.g., customers). The merchant locations include physical merchant locations where the users may visit in order to select items for purchase and engage in a transaction to purchase the items. The merchant locations may include one or more merchants or merchant employees (referred to herein collectively as the "merchant" or "merchants") that may assist the user in finding items, provide items to the user, and/or engage in a transaction with a user. The merchants may be mobile, and may have mobile merchant devices for transaction processing, such as tablet computers, handheld mobile devices, smart mobile phones, and other types of mobile communication devices. These devices may allow the user and merchant to establish a transaction and process the transaction using a payment instrument for the user. For example, the user may browse items at the merchant location, select one or more items for purchase, and visit a merchant to purchase the items through a transaction generated by the merchant's device. In other embodiments, the user may instead select items for purchase from the merchant, such as a restaurant, who may serve multiple users and be mobile between the users' locations.

In order to generate a transaction, the merchant may initiate a transaction using the communication device, for example, by entering items to a communication device for the user through scanning of item barcodes, selection of items on an interface of the communication device, entry of item identifiers, entry of item price, or otherwise providing transaction information to the communication device. The communication device may therefore correspond to a mobile device, such as a smart phone, which may include various features and components such as a display, input devices, processor, memory, network interface component for network communications. In various embodiments, the communication device further includes a RFID tag reader, a camera capable of scanning visual codes (e.g., QR or bar codes), and/or other devices for entry of item information to the communication device. The communication device may be used to process a transaction using an application executing on the communication device, such as a sales application associated with the merchant. For example, after receipt of an identifier for each of the one or more items for purchase and/or selection of the one or more items through an application interface of the mobile application, the communication device may generate a transaction for purchase of the selected item(s) by the user. Once the transaction is generated with associated costs (e.g., tax, tip, surcharges, etc.), the transaction may be ready for payment processing. However, in various embodiments, tip and other additional fees or payments may later be added by the user to the transaction during payment processing.

The merchant may require payment information from the user for processing of the transaction. For example, the user may provide a debit, credit, or other type of payment card (including gift cards and/or payment cards associated with an online payment provider, such as PayPal®) as a payment instrument to the merchant for payment of the transaction. In other embodiments, different payment instruments may be used, such as key fobs or other types of electronically readable payment instruments. Thus, the payment instrument (e.g., payment card) may include a non-transitory memory component that stores payment instrument information used during payment processing. In order to read the payment instrument and enter the payment instrument information (e.g., card number, expiration, backend processing pathway information, etc.), the merchant may require a terminal to read the data stored to the non-transitory memory of the payment instrument. For example, a terminal may correspond to a magnetic card reader and/or a smart card reader. A magnetic card reader may be utilized to read a magnetic strip disposed of on the payment instrument. Similarly, a smart card reader may correspond to an EMV smart card reader configured to receive information using RFID from a contact or contactless payment card having an embedded integrated circuit. With mobile communication devices used by the merchants, the terminal may also be wirelessly connected to the mobile communication device so that the terminal may be passed to a user for the user to swipe, insert, tap, or otherwise enter their payment card or payment card information to the terminal. Moreover, wireless terminals may provide additional security to users by allowing the user to more secretively and/or personally provide their personal identification number (PIN), password, and/or signature.

In this regard, the wireless terminals may be required to be wirelessly connected to respective merchant devices in order to provide payment processing between the wireless terminals and the merchant devices. The merchant devices and wireless terminals may wirelessly connect through WiFi, Bluetooth, Bluetooth Low Energy, LTE Direct, near field communications, radio, microwave, infrared, or other wireless communication protocol. Specific merchant device may connect with a specific terminal so that only those two devices send and receive data, such as payment instrument information used in a transaction processed with the merchant device. Thus, one to one pairing may be preferable to prevent incorrect transaction processing. If more than one terminal is connected to the merchant device, or more than one merchant device is connected to a terminal, then incorrect payment instrument information may be entered to a transaction and users may be incorrectly billed. However, as a merchant employee moves and separates from a wireless terminal and/or a wireless terminal loses power, maintaining the one to one connection between merchant device and wireless terminal may be difficult and/or cumbersome. Moreover, navigating through the merchant device interfaces to look up nearby devices for connection, determining available wireless terminals, physically identifying the wireless terminals, and connecting the devices may cause difficulties.

Thus, each wireless terminal includes a dongle device configured as at least a non-transitory memory for data storage as well as an integrated connection interface, such as a USB interface, a Micro-USB interface, Apple® Lightning® interface, or other type of connection interface. The dongle device may further include a processor, as well as applications for executing one or more processes with the dongle device. For example, in various embodiments, the dongle device may further include an input interface for receipt of a code, password, or other unlocking mechanism, as well as associated applications to allow use of the dongle device and terminal. In other embodiments, the dongle device may include a biometric detection device configured to provide biometric (e.g., fingerprint) processing and locking/unlocking. Further components may also be associated with the dongle device. The dongle device may include in the non-transitory memory at least connection information for the terminal. The connection information may include at least one connection parameter for use in connecting the merchant's communication device to the terminal. For example, a connection parameter may include a connection pathway (e.g., communication port addresses, a unique identifier for the terminal, other identifiers, etc.). Further connection parameters may specify a type of communication protocol (e.g., Bluetooth, WiFi, etc.) and/or communication protocol specifications. The connection information may further include executable processes, such as a process to load the connection parameter(s) to the merchant device and cause a connection to be established between the communication device and the terminal. However, in other embodiments, the process to load connection parameters and establish a connection may instead reside on the merchant's communication device, such as an application, plug-in to another application, operating system process, etc.

The dongle device may also be physically attached to the wireless terminal, such as through a cord, lanyard, extension cable, or other attachment mechanism. In other embodiments, the dongle device and the terminal may be associated through information or other process. When retrieving a terminal, the merchant may connect the dongle device directly to the communication device of the merchant. For example, the interface of the dongle device may be inserted to a matching input port of the communication device to accept the dongle device. Once connected, the connection information for the wireless terminal may be loaded to the merchant's communication device. The communication device may then execute a process to utilize the connection parameter(s) with connection protocol information for various connection protocols used by the communication device to establish a wireless connection between the merchant's communication device and the terminal. The wireless connection may the allow the communication device and the terminal to communicate, for example, to exchange keys for a secure communication session, transmit encrypted/unencrypted information, and/or process payments through transfer of payment instrument information.

Thus, after the communication device and the terminal are paired, and a transaction is entered by the merchant, the communication device may be ready to perform transaction processing. Where a total has not been calculated, the communication device may generate a total, as well as provide the total to the terminal for viewing by the user. The user may utilize the terminal to confirm the total and/or add a tip or other additional amount to the total. The user and/or merchant may also add any content to the transaction. When ready, the user may enter payment card information using features of the terminal, for example, by entering an EMV smart card to a reader of the terminal. The user may further be required to provide a PIN or an electronic signature. Once confirmed, the communication device may be ready to process the transaction with a backend financial institution to receive a payment to the merchant from the user.

The communication device may contact a backend payment processor, such as a credit provider, bank, online payment provider, or other financial institution to perform transaction processing. For example, the merchant may accept Visa®, Discover®, American Express®, PayPal®, and/or Venmo® at a specific merchant location when the user wishes to pay for a transaction. The communication device may provide the transaction information, such as a price or cost of the transaction, with the payment instrument information (e.g., a card identifier) and request payment to the merchant, for example, to an account for the merchant. The payment provider may then process a payment to the merchant using the user's payment account, the account of the merchant, and the transaction information. In various embodiments, a payment may not be processed where the payment provider cannot process the transaction, for example, where fraud is detect, if the user has insufficient funds, or other problem occurs during transaction processing. The merchant and/or payment provider may provide a transaction history to the user, such as a physical receipt where the user is required to sign in order to verify and record that the user authorized the transaction. The transaction history may also show a reason for denial or failure of processing the transaction, such as insufficient funds. The merchant and/or payment provider may also provide electronic receipts, which may be sent through text message, email, or other communications to an electronic account or device of the user for storage.

The merchant may remove the dongle device prior to, during, and/or after transaction processing. In certain embodiments, once the wireless connection between the communication device of the merchant and the terminal is established, the connection may be maintained until it is actively ended (e.g., closed through the communication device or terminal), a device runs out of power (which may only cause temporary loss of connection until power is restored), and/or the transaction finishes processing and/or the terminal become idle. In various other embodiments, when the merchant is finished with using the wireless terminal (e.g., after transaction processing), the merchant may remove the dongle device from the communication device. Once the dongle device is removed, one or more processes executed by the communication device may wipe and remove the connection parameter(s) for the connected terminal from the communication device, thereby severing the connection between the terminal and the communication device. In other embodiments, the connection may remain until a new dongle device is connected to the communication device. Once the new dongle device is connected, the previous connection parameters may be stored and/or deleted, while the new connection parameters for the new terminal supersedes the previous connection parameters and causes a new connection to the new terminal.

In other embodiments, the dongle device may instead be connected to a different device for pairing as described above two devices over a wireless connection. For example, the dongle device may instead be connected to an auxiliary component of a communication device system that may connect to the communication device system through wireless connections over a short range wireless communication protocol. In this regard, an auxiliary device may include wireless headphones, speakers, and/or microphones, as well as biometric sensing devices, wearable computing devices, and/or other types of connectable devices. In other embodiments, the connectable device may correspond to a console computing device of a vehicle, which may connect with a communication device using the dongle device, as described herein. Various other types of applications of the communication device may also receive data from or transaction data to the attached connectable device. For example, headphones and/or speakers may interface with a media playback application on the communication device, a console computing device may interface with a GPS and mapping application on the communication device, etc. The dongle device may also be used to pair the communication device with a secure wireless router, such as a password protected Internet router. The communication device may utilize an secure private network access application to access a secure private network provided by a secure wireless router.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102 with a payment card 110, a terminal device 120, a merchant device 130, and a payment provider server 140 in communication over a network 150. User 102 may visit a merchant location for a merchant corresponding to merchant device 130. While at the merchant location, user 102 may select one or more items for purchase from the merchant, which may be entered to a transaction using merchant device 130. The merchant may utilize merchant device 130 for transaction processing with terminal device 120. Terminal device 120 may connect and synchronize with merchant device 130 using a dongle device connectable to merchant device 130. The dongle device may provide connection parameters to merchant device 130 and allow merchant device 130 to establish a wireless connection with terminal device 120. User 102 may then provide payment card 110 to terminal device 120 for communication to merchant device 130 and processing in the transaction. The transaction may be processed using payment provider server 140 to provide a payment to the merchant from user 102.

Terminal device 120, merchant device 130, and payment provider server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

User 102 may utilize payment card 110 to provide a payment to a merchant associated with merchant device 130, for example, during processing a transaction to pay for one or more items in the transaction. In this regard, payment card 110 may correspond to a payment instrument associated with a financial account that includes held funds, credit, investments, and/or other types of financial security or instrument used to provide payments to another party from user 102. Thus, payment card 110 may be associated with a financial instrument of user 102 and may utilize the financial instrument to provide payment on behalf of user 102. For example, payment card 110 may be associated with a payment account, available credit, and/or bank account held, serviced by, and/or accessible to payment provider server 140. In other embodiments, payment card 110 may correspond to another financial institution. Payment card 110 may be processed by payment provider server 140 to provide a payment to the merchant associated with merchant device 130 from user 102.

Payment card 110 may further include a storage component for storing payment instrument information, such as information for payment card 110. For example, a magnetic strip may store information for payment card 110, such as a cardholder name (e.g., name for user 102), the account number for payment card 110 and/or the associated account utilized when processing payment card 110 to provide payments, the expiration date of payment card 110, and/or the card security code or card verification code of payment card 110 (e.g., a number associated with the card and normally found on the back of the card near a signature line). In various other embodiments, payment card 110 may correspond to an EMV (e.g., Europay®, MasterCard®, Visa®) or other smart card having an embedded integrated chip storing information utilizing the EMV standard or other technical standard. In such embodiments, payment card 110 may be a contact (e.g., inserted) card or a contactless (e.g., read through NFC or other short range wireless protocol) card, and may include similar information to a magnetic strip (e.g., cardholder name, account number, expiration date, and security code). Payment card 110 may be utilized with terminal device 120 to provide payments to the merchant associated with merchant device 130, as discussed herein.

In various embodiments, user 102 may further have a communication device, such as a mobile smart phone, tablet computer, or other type of mobile communication device in possession of user 102 at a merchant location. The communication device may include a payment application, which may be configured to interact with payment provider server 140 to perform various transactions and transaction review. For example, the communication device may receive the results of transaction processing, which may include the use of payment card 120, and may display the result to user 102 and/or store the results for later review. Thus, the payment application may include or be associated with a payment account and/or digital wallet for user 102 with payment provider server 140. The payment application may further provide one or more interfaces for display of received transaction information, for example, a transaction between user 102 and the merchant associated with merchant device 130. The transaction may be received from merchant device 130 and displayed to user 102 for review prior to providing payment using payment card 110. In other embodiments, the communication device may include additional or different modules having specialized hardware and/or software as required.

Terminal device 120 may correspond to a hardware device normally associated with a point of sale device or other type of device that engages in transactions using payment instrument input read by terminal device 120. In this regard, terminal device 120 may correspond to a stand-alone device connectable to at least one other communication device for payment processing, such as merchant device 130. Terminal device 120 may include hardware and software for wireless communications with another device, such as merchant device 130, over a communication protocol. In various embodiments, the communication protocol may correspond to near field communication, Bluetooth communication, Bluetooth Low Energy (BLE) communication, WiFi communication, and LTE Direct communication. Terminal device 120 may further have connection parameters used to connect with terminal device 120, such as a communication port identifier, name, wireless connection address, or other identifier used in identification of and connection to terminal device 120. Such information may be stored to a database of terminal device 120. Moreover, the aforementioned information may be stored to dongle device 124, for example, by a manufacturer of terminal device 120, by terminal device 120 itself, and/or by an administrator configuring terminal device 120 with dongle device 124. Additionally, the communication module or interface of terminal device 120 may be used to communicate read payment instrument information, such as data from a payment card, to a connected device (e.g., merchant device 130).

Additionally, terminal device 120 of FIG. 1 contains a payment card reader 122 and a dongle device 124. Payment card reader 122 and dongle device 124 may correspond to devices having executable processes, procedures, and/or applications with associated hardware. In other embodiments, terminal device 120 may include additional or different devices as required. For example, although terminal device 120 is described as being used in payment processing and having payment card reader 124, in other embodiments, terminal device 120 may correspond to other device accessories and auxiliary components, including Internet routers, speakers, a microphone, a biometric detector, headphones, vehicle console devices, or other connectable computing devices.

Payment card reader 122 and dongle device 124 may correspond to one or more devices used to provide payment processing by connecting terminal device 120 to merchant device 130, reading data stored to a non-transitory memory of payment card 110, and providing payment instrument information to merchant device 130 from terminal device 120 using the connection.

For example, payment card reader 122 may include hardware and associated software to read data stored to a storage medium of payment card 110. The data stored to the storage medium of payment card 110 may include payment instrument information, such as a cardholder name (e.g., name for user 102), an account number for payment card 110, an expiration date of payment card 110, and a security code for payment card 110. The storage medium may correspond to a non-transitory memory, which may include a magnetic strip disposed of on a card surface, an integrated circuit chip (e.g., an RFID chip) inserted into the body of payment card 110, and/or another type of memory unit, such as an RFID tag within a key fob. Thus, payment card reader 122 may correspond to a magnetic card reader capable of reading magnetic strips and/or a smart card reader, which may be capable of reading EMV standard or other technical standard smart card chips using a contact or contactless reader. Once payment card reader 122 has the payment instrument information retrieved from payment card 110, payment card reader 122 may utilize the wireless communication capabilities (e.g., a communication module and associated hardware and software for wireless communications over a communication protocol) to transmit the payment instrument information to merchant device 130 over a wireless connection between terminal device 120 and merchant device 130.

Dongle device 124 may correspond to a separate hardware device physically connected to or otherwise associated with terminal device 110. For example, in one embodiment, dongle device 124 may be connected using a lanyard, cord, extendable cable, or other connection mechanism. However, in other embodiments, dongle device 124 and terminal device 120 may be paired using other association mechanisms, such as numbering, names, color, shape, or other physical property. Dongle device 124 may appear and function similar to a USB flash drive having at least a memory and a connection interface capable of physically connecting to an input port of merchant device 130. Thus, dongle device 124 may include a database stored to a non-transitory memory and may store the connection information for terminal device 120 having at least one connection parameter for use in establishing a connection between terminal device 120 and merchant device 130. Thus, once dongle device 124 is connected, the connection information may be automatically loaded to merchant device 130 and cause the connection parameter(s) to configure merchant device 130 to establish a wireless connection between terminal device 120 and merchant device 130. In this regard, the database of dongle device 124 may further store one or more processes to automatically execute on connection to merchant device 130 and cause the connection information to be established with merchant device 130 and configure a communication module 138 of merchant device 130 to connect to terminal device 120. In various embodiments, in order to execute the processes and configure communication module 138 of merchant device 120 to connect with terminal device 120 automatically, dongle device 124 may further include processors and associated software necessary to establish and execute the processes. Dongle device 124 may provide processes only to configure merchant device 130 for a connection with terminal device 120. However, in other embodiments, dongle device 124 may also provide a process to clear the connection information and associated processes from merchant device 130 on detection that dongle device 124 is removed from merchant device 130 (e.g., disconnected). Moreover, dongle device 124 may further include additional features, such as authentication hardware and software, to only allow authenticated users to utilize dongle device 124 to wireless connect terminal device 120 to the device physically connected to dongle device 124. For example, an input interface may require an alphanumeric password, a biometric scan (e.g., fingerprint), or other authentication mechanism.

Merchant device 130 may be maintained, for example, by a merchant at a merchant location corresponding to merchant device 130, which may offer one or more items for purchase at the merchant location. In this regard, merchant device 130 include one or more processing applications which may be configured to interact with terminal device 120 and/or payment provider server 140 to facilitate generation of a transaction and payment to the merchant for the transaction. In various embodiments, merchant device 130 may also correspond to devices offering online sale of items, which user 102 may purchase while at a merchant location. However, in other embodiments, merchant device 130 may be maintained by or include any merchant, including merchants that offer offline sales of items through a merchant location. Merchant device may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE. Moreover, although only a single merchant device is referenced herein, a plurality of merchant devices may function similarly.

Merchant device 130 of FIG. 1 contains a sales application 132, other applications 134, a database 136, and a communication module 138. Sales application 132 and other applications 134 may correspond to processes, procedures, and/or applications executable by a hardware processor, for example, a software program. In other embodiments, merchant device 130 may include additional or different modules having specialized hardware and/or software as required.

Sales application 132 may correspond to one or more processes to execute modules and associated specialized hardware of merchant device 130 that provides a sales interface to sell one or more items offered by a merchant (not shown) associated with merchant device 130, and further provide payment processes for a transaction to purchase the items for sale from the merchant corresponding to merchant device 130. In this regard, sales application 132 may correspond to specialized hardware and/or software of merchant device 130 to provide a convenient interface to permit a merchant offer items for sale. For example, sales application 132 may be implemented as an application offering items for sale that may be utilized by the merchant or a merchant employee to enter items selected by a user to a transaction, determine a total cost for the transaction, and initiate a checkout and payment process for the transaction. The checkout and payment process may require a payment instrument to be proffered by user 102 for use in the transaction. The payment instrument may be processed, as discussed herein, in order to provide a payment for the transaction and complete transaction processing. However, in order to provide transaction processing through terminal device 120, sales application 132 may be required to connect with terminal device 120, for example, through the use of dongle device 124 to receive connection information for terminal device 120.

Thus, sales application 132 or another connectivity application of merchant device 130 may include processes to establish a connection with terminal device 120 using received connection information. In various embodiments, the processes may be provided by dongle device 124, as discussed herein, which may remain on merchant device 130 for a limited time (e.g., an amount of time, until the connection is severed, and/or until dongle device 124 is removed from merchant device 130). On detection of dongle device 124 connecting to an input port of merchant device 130, sales application 132 and/or the other application or processes may receive or access connection information from dongle device 124 for terminal device 120. The connection information includes at least one connection parameter for use with a communication protocol to establish a wireless connection between terminal device 120 and merchant device 130. The connection information may configure the connection settings of communication module 138 of merchant device 130 to establish a connection with terminal device 120. For example, the connection information may include an identifier for terminal device 120 and cause merchant device 130 to search for the identifier from receivable local broadcasts of identifier names and/or requests to establish a connection (e.g., search for nearby available devices having a Bluetooth connection channel available). The connection information and associated processes may therefore cause terminal device 120 and merchant device 130 to pair for purposes of transaction processing. The processes may execute in the background and/or without input from the merchant utilizing merchant device 130. For example, the process may automatically execute on connection of dongle device 124 so that further input is not required from the merchant to merchant device 130. Moreover, the merchant may be alerted through a notification in sales application 132, a toolbar, a connections icon, or other interface component when the connection between terminal device 120 and merchant device 130 is established.

Sales application 132 may include information for a price for the item, a discount for the item, a price change for the item, and/or other incentives for items and/or with the merchant corresponding to merchant device 130 (e.g., rebates, payments, etc.). Once the transaction is generated and terminal device 120 is communicating with sales application 132 through a wireless connection with merchant device 130, sales application 132 may be ready for transaction processing to receive a payment. Sales application 132 may receive payment instrument information for payment card 110 from terminal device 120 using payment card reader 122. Sales application 132 may utilize the payment instrument information with transaction information to process the payment, for example, by communicating the aforementioned information with additional merchant information to a payment processing system, such as payment provider server 140. Payment provider server 140 may then process the information and provide a payment to the merchant, as discussed herein. In such embodiments, once a payment is processed for a transaction, for example, by having payment provided to the merchant account, notification of payment (or failure, for example, where there are insufficient user funds) may be sent to sales application 132. The payment may be made by payment provider server 140 on behalf of user 102 associated with payment card 110. Sales application 132 may then receive the results of the transaction processing, and complete the transaction with user 102, for example, by providing a receipt for the transaction and/or allowing user 102 to purchase the items and remove the items from the merchant location.

Sales application 132 and/or another connectivity application of merchant device 130 may further be used to maintain a connection with terminal device 120 even after completion of the aforementioned transaction using payment instrument information received from terminal device 120. In other embodiments, sales application 132 and/or the other connectivity application may also terminate the wireless connection with terminal device 120. For example, the merchant may select to terminate the connection through one or more application interfaces. In other embodiments, the connection may be terminated when terminal device 120 is shut off, runs out of power, or is removed from the range of the wireless connection. Moreover, the connection may also be terminated on detection that dongle device 124 is no longer connected to merchant device 124 and/or a new dongle device is connected to merchant device 124. The connection information for terminal device 120 may remain for future connections or may be wiped from merchant device 120 after ending of the connection.

Merchant device 130 includes other applications 134 as may be desired in particular embodiments to provide features to merchant device 130. For example, other applications 134 may include security applications for implementing client-side security features, programmatic client applications for interfacing with appropriate application programming interfaces (APIs) over network 150, or other types of applications. Other applications 134 may also include email, texting, voice and IM applications that allow a user to send and receive emails, calls, texts, and other notifications through network 150. In various embodiments, other applications 134 may include financial applications, such as banking, online payments, money transfer, or other applications associated with payment provider server 140. Other applications 134 may contain software programs, executable by a processor, including a graphical user interface (GUI) configured to provide an interface to user 102.

Merchant device 130 may further include database 136 which may include, for example, identifiers such as operating system registry entries, cookies associated with sales application 132 and/or other applications 134, identifiers associated with hardware of merchant device 130, or other appropriate identifiers, such as identifiers used for payment/user/device authentication or identification. Identifiers in database 136 may be used by a payment/credit provider, such as payment provider server 140, to associate merchant device 130 with a particular account maintained by the payment/credit provider. Merchant, item, sales, and/or benefit information for items sold by the merchant associated with merchant device 130 may be stored to database 136. Database 136 may further include transaction information and/or results, including transaction histories. Additionally, connection information for terminal device 120 may be stored to database 136 at least temporarily in order to cause a connection between terminal device 120 and merchant device 130.

Merchant device 130 includes at least one communication module 138 adapted to communicate with terminal device 120 and/or payment provider server 140. In various embodiments, communication module 138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Payment provider server 140 may be maintained, for example, by an online service provider, which may provide payment and financial services to a user. In this regard, payment provider server 140 includes one or more processing applications which may be configured to interact with terminal device 120, merchant device 130, and/or another device/server to provide transaction processing, account services, and other financial processes. In one example, payment provider server 140 may be provided by PAYPAL®, Inc. of San Jose, Calif., USA. However, in other embodiments, payment provider server 140 may be maintained by or include another type of service provider, which may provide connection services to a plurality of users.

Payment provider server 140 of FIG. 1 includes a transaction processing application 142, other applications 144, a database 146, and a network interface component 148. Transaction processing application 142 and other applications 144 may correspond to executable processes, procedures, and/or applications with associated hardware. In other embodiments, payment provider server 140 may include additional or different modules having specialized hardware and/or software as required.

Transaction processing application 142 may correspond to one or more processes to execute software modules and associated specialized hardware of payment provider server 140 to provide payment services to merchants and users, for example though a payment account and/or payment instruments. In this regard, transaction processing application 142 may correspond to specialized hardware and/or software to provide payment services and payment accounts, including digital wallets storing payment instruments and/or payment instrument information. The payment services may allow for a payment to the merchant by a user through a payment instrument, including a credit/debit card, banking account, payment account with payment provider server 140, and/or other financial instrument. In order to establish a payment account for a merchant and/or user to send and receive payments, transaction processing application 142 may receive information requesting establishment of the payment account. The information may include user personal and/or financial information. Additionally the information may include a login, account name, password, PIN, or other account creation information. The merchant/user may provide a name, address, social security number, or other personal information necessary to establish the account and/or effectuate payments through the account. Transaction processing application 142 may further allow the merchant/user to service and maintain the payment account, for example, by adding and removing payment instruments. In various embodiments, a payment application (e.g., payment application 112) and payment process using terminal device 120 may be associated with terminal device 120 for transaction processing.

Transaction processing application 142 may be used to provide a payment for an item to a merchant, for example, between user 102 and a merchant corresponding to merchant device 130. In this regard, transaction processing application 142 may receive the transaction after approval of the transaction to be processed is generated and provided by merchant device 130 using terminal device 120 to receive payment instrument information from payment card 110. Thus, the transaction may be received from merchant device 130 with payment instrument information, as well as merchant information necessary to effectuate a payment to the merchant associated with merchant device 130. The transaction may include a transaction amount, and may designate payment card 110 and/or the account associated with payment card 110 as the payment instrument. Transaction processing application 142 may debit an account of user 102 automatically and provide the payment to an account of the merchant. Transaction processing application 142 may also be used to provide transaction histories for processed transactions. Based on the transaction processing, a receipt may be provided to merchant device 130 and/or generated by merchant device 130 after receiving acknowledgement and/or proof of payment by user 102 to the merchant through transaction processing application 142.

In various embodiments, payment provider server 140 includes other applications 144 as may be desired in particular embodiments to provide features to payment provider server 134. For example, other applications 144 may include security applications for implementing server-side security features, programmatic client applications for interfacing with appropriate application programming interfaces (APIs) over network 150, or other types of applications. Other applications 144 may contain software programs, executable by a processor, including a graphical user interface (GUI), configured to provide an interface to user 102 when accessing payment provider server 140, where user 102 or other users may interact with the GUI to more easily view and communicate information. In various embodiments, other applications 144 may include connection and/or communication applications, which may be utilized to communicate information to over network 150.

Additionally, payment provider server 140 includes database 146. As previously discussed, user 102 and/or the merchant corresponding to merchant device 120 may establish one or more digital wallets and/or payment accounts with payment provider server 140. Digital wallets and/or payment accounts in database 146 may include user information, such as name, address, birthdate, payment instruments/funding sources, additional user financial information, user preferences, and/or other desired user data. Users and/or merchants may link to their respective digital wallets and/or payment accounts through an account, user, merchant, and/or device identifier. Thus, when an identifier is transmitted to payment provider server 140, one or more digital wallets and/or payment accounts belonging to user and/or merchants may be found. Database 146 may also store transaction information and transaction processing results.

In various embodiments, payment provider server 140 includes at least one network interface component 148 adapted to communicate with terminal device 120 and/or merchant device 130 over network 150. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
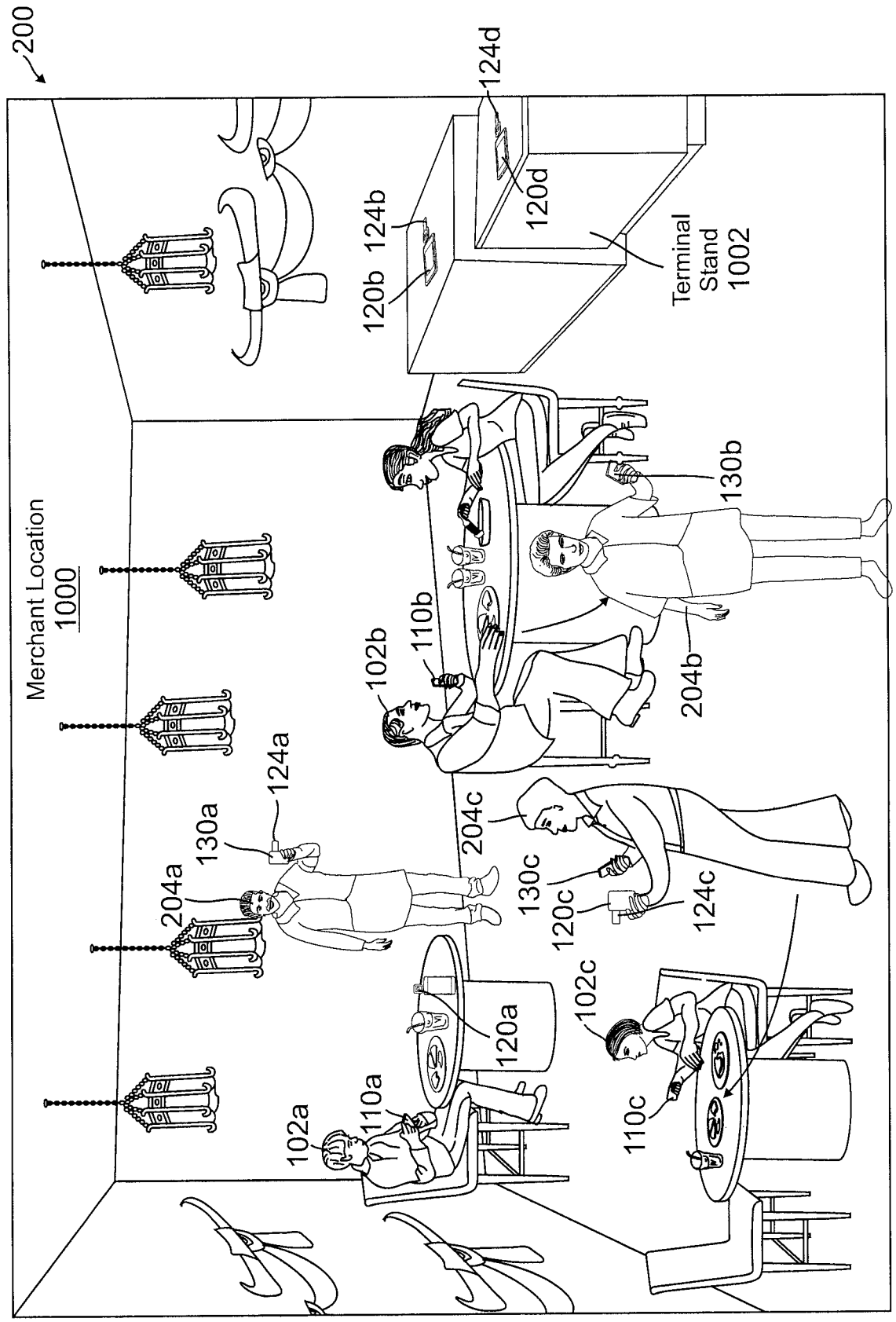
FIG. 2 is an exemplary environment where multiple terminals having associated dongle devices may be paired to devices at a location, according to an embodiment.

FIG. 2 is an exemplary environment where multiple terminals having associated dongle devices may be paired to devices at a location, according to an embodiment. Environment 200 of FIG. 2 includes a payment card 110a, a payment card 110b, and a payment card 110c corresponding generally to payment card 110 in system 100 of FIG. 1. Environment 200 further includes a terminal device 120a having a dongle device 124a, a terminal device 120b having a dongle device 124b, a terminal device 120c having a dongle device 124c, and a terminal device 120d having a dongle device 124d corresponding generally to terminal device 120 having dongle device 124 in system 100 of FIG. 1. Additionally, environment 200 includes a merchant device 130a, a merchant device 130b, and a merchant device 130c corresponding generally to merchant device 130 in system 100 of FIG. 1.

A merchant location 1000 in environment 200 may include various visiting users engaging in transactions with available merchants in order to purchase items from the merchants. For example, merchant location 1000 may correspond to a restaurant where a user 102a, a user 102b, and a user 102b may dine at and purchase items from a merchant 204a, a merchant 204b, and a merchant 204c. In this regard, users 102a-c may visit merchant location 1000 to purchase one or more items (e.g., food consumed at merchant location 1000) and may wish to complete a transaction with merchants 204a-c. User 102a may be ready to complete a transaction and have payment card 110a ready to provide payment for the transaction. As shown in merchant location 1000, merchant 204a is located at a table for user 102a. Merchant 204a has merchant device 130a for use in processing the transaction. In order to receive payment instrument information from payment card 110a of user 102a, merchant 204a may provide terminal device 120a to user 102a to enter payment card 110a to terminal device 120a. Moreover, dongle device 124a is connected to merchant device 130a thereby creating a connection between terminal 120a and merchant device 130a. Thus, when user 102a enters payment card 110a into terminal device 120a, the payment instrument information for payment card 110a may be read and communicated to merchant device 130a by terminal device 120a for entry to the transaction on merchant device 130a.

Additionally, user 102b may similarly be ready to complete a transaction for selected items at merchant location 1000. As shown in merchant location 1000, user 102b is in possession of a payment card 110b and ready to process a payment with merchant 204b. However, merchant 204b does not currently have a payment processing terminal in merchant 204b's possession and/or connected to merchant device 130b used by merchant 204b. Thus, merchant 204b may visit a terminal stand 1002, which may include available terminals, as well as provide power and charging services to such terminals. Terminal device 120b having dongle device 124b and terminal device 120d having dongle device 124d are located at terminal stand 1002. Thus, when merchant 204b arrives at terminal stand 1002, merchant 204b may pick up terminal device 120b and take dongle device 124b attached to terminal device 120b. Merchant 204b may know that dongle device 124b is associated with terminal device 120b as dongle device 124b is attached to terminal device 120b. Thus, when dongle device 124b is connected to merchant device 130b in possession of merchant 204b, merchant device 130b may pair with terminal device 120b so that terminal device 120b may read payment card 110b for user 102b and communicate payment instrument information for payment card 110b to merchant device 130b.

For example, merchant 204c is returning to user 102c for transaction processing. User 102c may be ready to provide payment for a transaction using payment card 110c. Merchant 204c may have just returned from retrieving terminal device 120c from terminal stand 1002. In order to process the transaction with user 102c using payment card 110c, merchant 204c may require a connection between terminal device 120c and merchant device 130c. Thus, merchant 204c may utilize dongle device 124c connected to terminal device 120c to establish the connection. Merchant 204c may insert dongle device 124c into merchant device 130c, and connection information for terminal device 120c may be loaded and configured on merchant device 130c to cause establishment of a connection between terminal device 120c and merchant device 130c.

Figure 3:
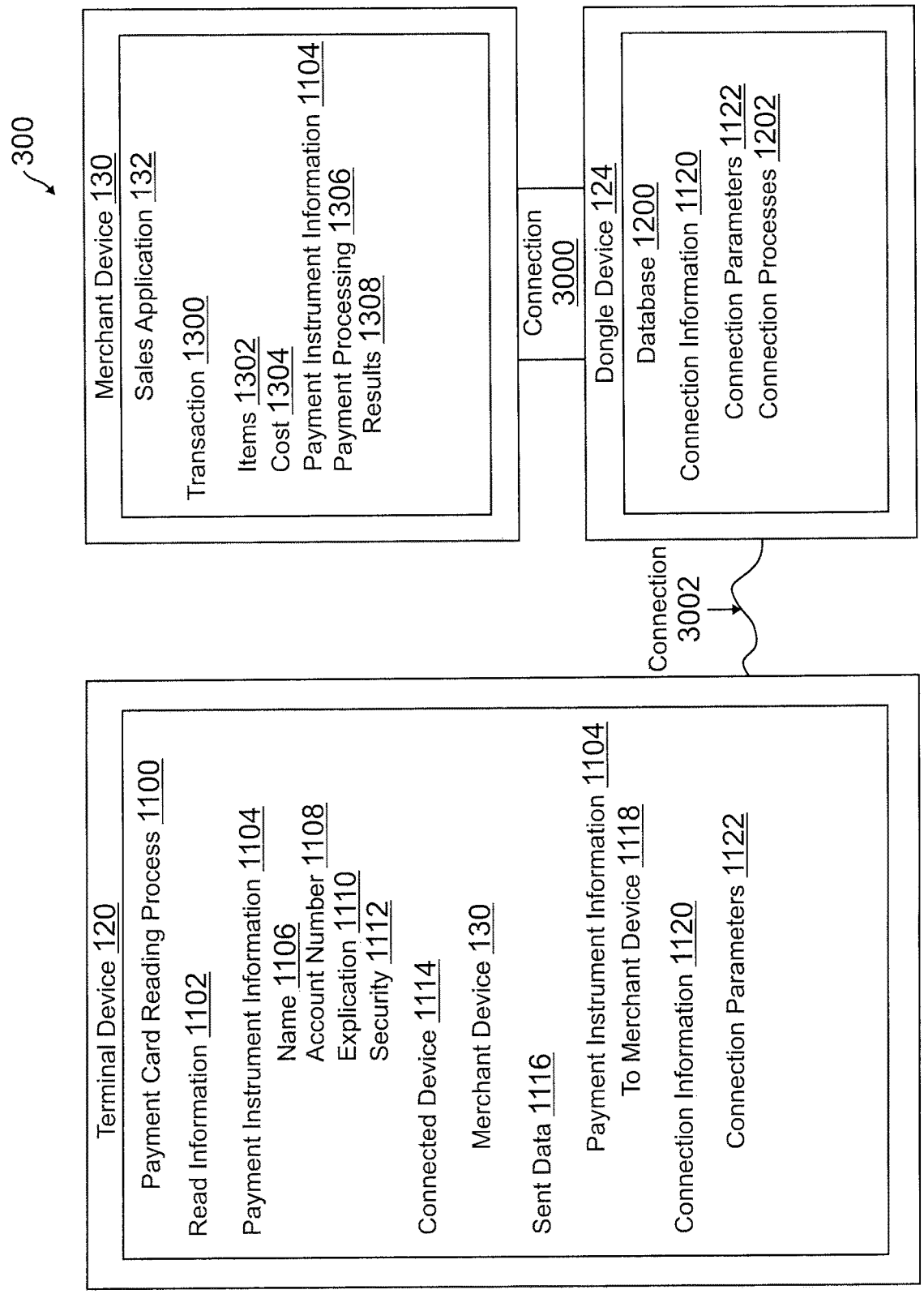
FIG. 3 is an exemplary system environment having a merchant device connected a terminal device using a connected dongle device for transaction processing using an online payment provider, according to an embodiment.

FIG. 3 is an exemplary system environment having a merchant device connected a terminal device using a connected dongle device for transaction processing using an online payment provider, according to an embodiment. Environment 300 of FIG. 3 includes a terminal device 120, a dongle device 124, and a merchant device 130 corresponding generally to described devices and associated features found in system 100 of FIG. 1.

Terminal device 120 includes a payment card reading process 1100 corresponding generally to the specialized hardware and/or software modules and processes described in reference to FIG. 1. In this regard, payment card reading process 1100 includes information for use in processing a transaction by merchant device 130 using a payment card read by terminal device 120. For example, payment card reading process 1100 includes, processes, and transmits read information 1102 for a payment card. Read information 1102 includes payment instrument information 1104 for the payment card, such as a name 1106, an account number 1108, expiration 1110, and/or a security 1112.

Payment card reading process 1100 further includes and processes data for a connected device 1114, such as merchant device 130. Merchant device 130 may become connected device 1114 using dongle device 124 as discussed herein. Using information for connected device 1114, payment card reading process 1100 further includes sent data 1116 transmitted to merchant device 130, which may include the aforementioned payment instrument information 1104, shown as sent data "to merchant device 1118." Additionally, payment card reading process 1100 and terminal device 120 may be associated with connection information 1120 for use in establishing connections with terminal device 120, which may include connection parameters 1122.

Terminal device 120 is connected to dongle device 124 through connection 3002, such as a physical connection (e.g., a lanyard, cord, cable, etc.) and/or an association (e.g., not physically attached but associated through color shape, numbering, name, etc.). Dongle device 124 includes at least a database 1200 including information for use in causing a device that dongle device 124 is inserted into to connect with terminal device 120. In this regard, database 1200 includes connection information 1120 from terminal device 120. Connection information 1120 include connection parameters 1122 for use in establishing a connection with terminal device 120 using a communication protocol accepted by terminal device 120 and associated with connection parameters 1122. Moreover, connection information 1120 may further include connection processes 1202 that may cause a connected device to load and setup a connection using connection parameters 1122.

Thus, dongle device 124 includes a connection interface that may connect to merchant device 130 through connection 3000 and cause merchant device 130 to pair with terminal device 120. Merchant device 130 further executes sales application 132 corresponding generally to the specialized hardware and/or software modules and processes described in reference to FIG. 1. In this regard, sales application 132 may be used to process a transaction based on the wireless connection between terminal device 120 and merchant device 130. For example, the wireless connection may be used to transfer payment instrument information from terminal device 120 after reading a payment card to merchant device 130 for use by sales application 132. Sales application 132 includes a transaction 1300 for processing by sales application 132, which may include items 1302 and a cost 1304. Sales application 132 may require payment information to process transaction 1300, which may be received from terminal device 120 as payment instrument information 1104. Using payment instrument information 1104, sales application may provide payment processing 1306 and receive results 1308, such as a successful or failed payment processing and associated transaction history.

FIG. 4 is a flowchart for dongle device for automatic pairing of payment terminal to mobile computing device, according to an embodiment. Note that one or more steps, processes, and methods described herein may be omitted, performed in a different sequence, or combined as desired or appropriate.

At step 402, in response to a dongle device connecting to a computing device system, connection information for the connectable device is received by the computing device system that comprises one or more hardware processors coupled to a non-transitory memory, wherein the connection information comprises at least one connection parameter for a connectable device and for use in establishing a wireless connection between the computing device system and the connectable device. The non-transitory memory may further store an application associated with the connectable device, wherein the application comprises at least one interface for use with information received from the connectable device. The application may comprise a sales application executing on the computing device system to generate a transaction between the merchant and the customer at the merchant location. The dongle device may be physically connected to the connectable device.

In various other embodiments, the connectable device comprises an Internet router device providing a secure network requiring network authentication credentials, wherein the at least one connection parameter comprises the network authentication credentials. The router device may also provide a secure private network accessible using connection information provided by the dongle device. Additionally, the dongle device may comprise a biometric scanner to authenticate a user for use of the secure network, wherein the dongle device provides the connection information to the computing device system after authentication of the user using the biometric scanner. Moreover, at least one other device may be notified if the dongle device is removed from a location associated with the secure network, for example, through geo-location detection, short range wireless communication detection, and/or RFID tag detection. In other embodiments, the dongle device may be associated with a vehicle, wherein the connectable device comprises a console computing device of the vehicle, and wherein the connection information pairs the computing device to the console computing device. Furthermore, the connectable device may comprise one of headphones, a device microphone, a biometric detection device, and device speakers, and wherein the dongle device is attached to the connectable device.

The connection information is processed using communication protocol information comprising at least one communication protocol for establishing the wireless connection with the connectable device, at step 404. The at least one communication protocol may comprise one of near field communication, Bluetooth communication, Bluetooth Low Energy (BLE) communication, WiFi communication, and LTE Direct communication. At step 406, the wireless connection with the connectable device is established using one of the at least one communication protocol, wherein the wireless connection is established using the at least one connection parameter for the connectable device.

At step 408, the connectable device is in communication with the computing device system. The computing device system may comprise a merchant device for payment processing at a merchant location for a merchant. The connectable device may comprise a payment processing terminal that receives payment information from a customer and the merchant location. The payment processing terminal may comprise at least one of a magnetic card reader for reading a magnetic stripe of a payment card and an EMV smart card reader for reading an integrated chip of a payment card. Thus, a transaction may be displayed to the customer using one of the computing device system and the connectable device, and may be processed using information received by the terminal device, such as a payment card. The computing device system may also communicate the transaction to a communication device of the customer at the merchant location.

In various embodiments, the dongle device further comprises executable code to cause loading of a payment process in a transaction interface of the sales application, wherein the at least one connection parameter pairs the payment processing terminal to the payment process, and wherein the payment processing terminal directly enters payment information for a payment instrument of the customer to the payment process in the transaction interface. Additionally, it may be detected that the dongle device is disconnected from the input port of the computing device system. In such embodiments, the wireless connection with the connectable device may be disconnected, and the connection information for the connectable device may be removed from the computing device system. In certain embodiments, the connection information for the connectable device is removed from the computing device system on detection of at least one further dongle device connecting to the input port of the computing device system.

Figure 5:
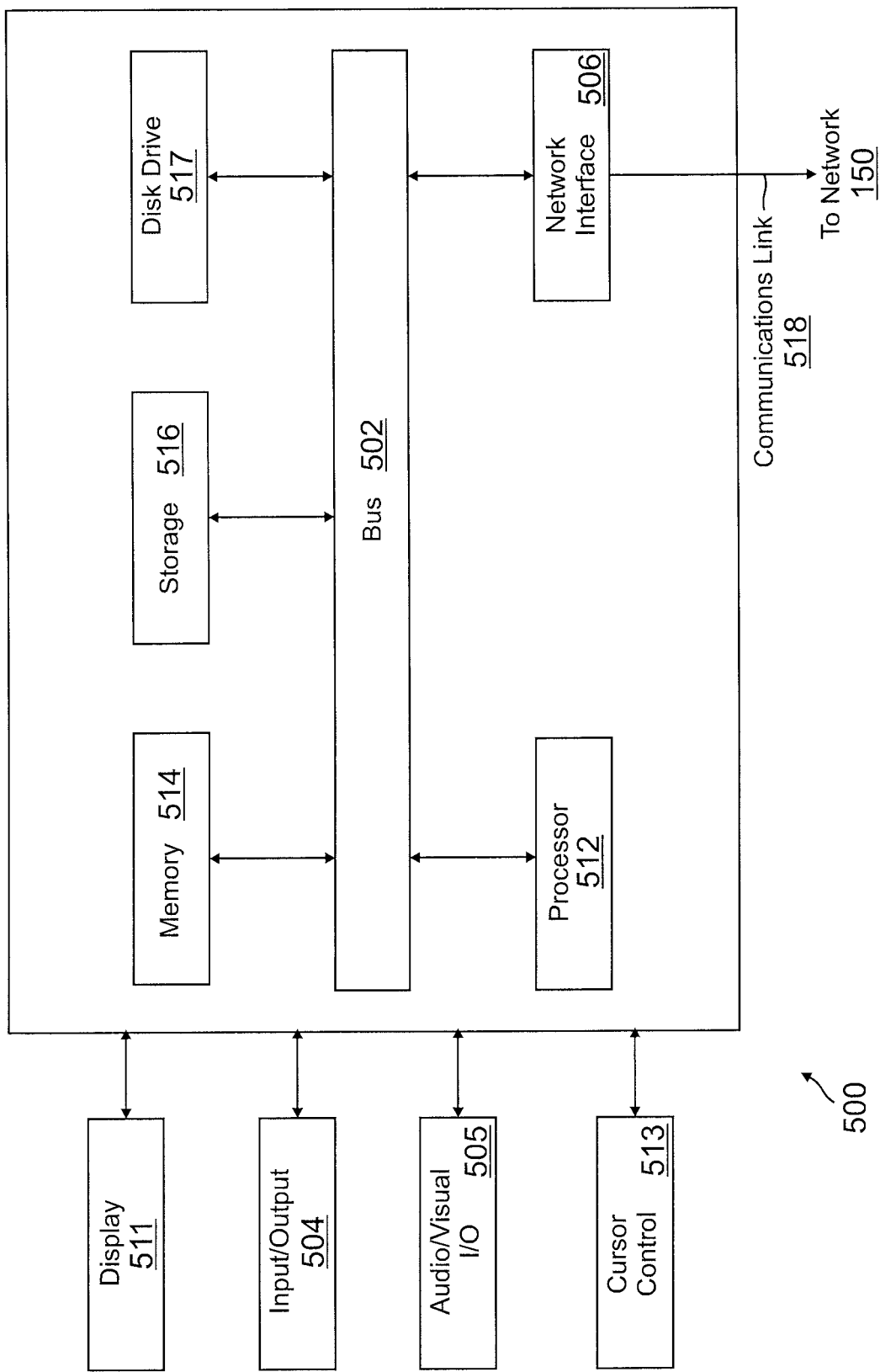
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the payment card may comprise a contactless smart card providing a controller, a memory and an antenna capable of transferring and receiving data using a near field communications capability for communication with wireless beacons or other wireless protocol devices (e.g., a smart phone). The merchant and/or payment service provider may utilize a network computing device (e.g., a network server) capable of communicating with the network. It should be appreciated that each of the devices utilized by users, merchants and payment service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computing device system comprising:
a non-transitory memory storing communication protocol information comprising at least one communication protocol for establishing wireless connections with payment processing terminals; and
one or more hardware processors configured to execute instructions to cause the computing device system to perform operations comprising:
in response to a first dongle device connecting to an input port of the computing device system, receiving first connection information for a first payment processing terminal, wherein the first connection information comprises a first connection parameter for the first payment processing terminal;
establishing a first wireless connection with the first payment processing terminal using a first one of the at least one communication protocol from the non-transitory memory, wherein the first wireless connection is established using the first connection parameter for the first payment processing terminal;
communicating with the first payment processing terminal;
storing the first connection parameter for the first payment processing terminal; and
in response to detecting a second dongle device connected to the input port, terminating the first wireless connection with the first payment processing terminal, wherein the second dongle device is associated with a second payment processing terminal.

2. The computing device system of claim 1, wherein the at least one communication protocol comprises one of near field communication, Bluetooth communication, Bluetooth Low Energy (BLE) communication, WiFi communication, or LTE Direct communication.

3. The computing device system of claim 1, wherein a stored application with the computing device system comprises at least one interface for use with information received from the first payment processing terminal.

4. The computing device system of claim 3, wherein the computing device system comprises a merchant device for payment processing through the first payment processing terminal.

5. The computing device system of claim 4, wherein prior to terminating the first wireless connection, the operations further comprise:
receiving, through the first payment processing terminal, payment information from a customer.

6. The computing device system of claim 5, wherein the payment information is received through one of a magnetic card reader of the first payment processing terminal or an EMV smart card reader of the first payment processing terminal.

7. The computing device system of claim 5, wherein the stored application comprises a sales application executing on the computing device system to generate a transaction between the merchant device and the customer at a merchant location.

8. The computing device system of claim 7, wherein the transaction is displayed to the customer using one of the computing device system or the first payment processing terminal.

9. The computing device system of claim 7, wherein the computing device system communicates the transaction to a communication device of the customer at the merchant location.

10. The computing device system of claim 7, wherein the first dongle device comprises executable code to cause loading of a payment process in a transaction interface of the sales application, and wherein the first connection parameter pairs the first payment processing terminal to the payment process.

11. The computing device system of claim 1, wherein the first dongle device is physically connected to the first payment processing terminal.

12. The computing device system of claim 1, wherein the operations further comprise:
  loading second connection information for the second payment processing terminal from the second dongle device, wherein the second connection information comprises a second connection parameter for the second payment processing terminal that enables automatically establishing a second wireless connection between the computing device system and the second payment processing terminal; and
  communicating with the second payment processing terminal.

13. The computing device system of claim 1, wherein prior to storing the first connection parameter, the operations further comprise:
  detecting that the first dongle device is disconnected from the input port, wherein the first connection parameter is stored in response to the detecting.

14. A method comprising:
  in response to a dongle device connecting to a computing device system, receiving, by the computing device system that comprises one or more hardware processors coupled to a non-transitory memory, connection information for a payment processing terminal, wherein the connection information comprises at least one connection parameter for the payment processing terminal;
  establishing a wireless connection with the payment processing terminal using one of at least one communication protocol stored by the computing device system, wherein the wireless connection is established using the at least one connection parameter for the payment processing terminal;
  communicating with the payment processing terminal;
  storing the one of the at least one connection parameter for the payment processing terminal;
  detecting that the dongle device is disconnected from the computing device system; and
  in response to the detecting, disconnecting the wireless connection with the payment processing terminal.

15. The method of claim 14, wherein the computing device system comprises a mobile device for use by a merchant employee at a merchant location associated with the merchant employee.

16. The method of claim 15, further comprising:
  executing a sales application for a payment of at least one item sold to a customer at the merchant location; and
  receiving, by the sales application a payment instrument for use with the payment from the payment processing terminal.

17. The method of claim 14, wherein the payment processing terminal comprises at least one of a magnetic card reader for reading a magnetic stripe of a payment card or an EMV smart card reader for reading an integrated chip of the payment card.

18. The method of claim 14, wherein the dongle device is physically connected to the payment processing terminal.

19. The method of claim 14, wherein the dongle device is associated with the payment processing terminal using one of a color, a shape, or a number shared between the dongle device and the payment processing terminal.

20. A non-transitory machine-readable medium having stored thereon machine-readable instructions executable to cause a machine to perform operations comprising:
  in response to a dongle device connecting to a computing device system, receiving, by the computing device system that comprises one or more hardware processors coupled to a non-transitory memory, connection information for a payment processing terminal, wherein the connection information comprises at least one connection parameter for the payment processing terminal;
  establishing a wireless connection with the payment processing terminal using one of at least one communication protocol stored by the computing device system, wherein the wireless connection is established using the at least one connection parameter for the payment processing terminal;
  communicating with the payment processing terminal;
  storing the one of the at least one connection parameter for the payment processing terminal;
  detecting that the dongle device is disconnected from the computing device system;
  in response to the detecting, disconnecting the wireless connection with the payment processing terminal; and
  removing the one of the at least one connection parameter for the payment processing terminal from the computing device system.

* * * * *